United States Patent [19]

Vetter

[11] Patent Number: 5,034,849
[45] Date of Patent: Jul. 23, 1991

[54] AXIALLY-WOUND ELECTRICAL CAPACITOR

[75] Inventor: Harald Vetter, Regensburg, Fed. Rep. of Germany

[73] Assignee: Siemens Aktiengesellschaft, Munich, Fed. Rep. of Germany

[21] Appl. No.: 493,985

[22] Filed: Mar. 15, 1990

[30] Foreign Application Priority Data

Mar. 20, 1989 [EP] European Pat. Off. ............ 89104952

[51] Int. Cl.$^5$ .............................................. H01G 4/42
[52] U.S. Cl. .................................................... 361/302
[58] Field of Search .............. 29/25.42; 361/302, 307, 361/306

[56] References Cited

U.S. PATENT DOCUMENTS

| | | | |
|---|---|---|---|
| 2,634,315 | 4/1953 | Allison et al. | 29/25.42 X |
| 3,001,267 | 9/1961 | Heibel et al. | 29/25.42 |
| 3,256,471 | 6/1966 | Cowles | 29/25.42 X |
| 3,538,572 | 11/1970 | Lull | 29/25.42 |

FOREIGN PATENT DOCUMENTS

| | | |
|---|---|---|
| 1166373 | 10/1964 | Fed. Rep. of Germany . |
| 1464375 | 5/1969 | Fed. Rep. of Germany . |
| 1479123 | 6/1969 | Fed. Rep. of Germany . |
| 3226406 | 1/1984 | Fed. Rep. of Germany . |
| 3544141 | 6/1986 | Fed. Rep. of Germany . |
| 506869 | 6/1971 | Switzerland . |

*Primary Examiner*—Donald A. Griffin
*Attorney, Agent, or Firm*—Hill, Van Santen, Steadman & Simpson

[57] ABSTRACT

An axially-wound electrical capacitor is composed of at least one capacitor winding arranged on a core tube. A respective metallic lead-through contact element is arranged at each of the two opposite end faces and is connected to a respective schoopage layer carried on the respective end face, the contact element being centered in the core tube. A plastic envelope covers the capacitor up to the lead-through regions for the external connections.

14 Claims, 3 Drawing Sheets

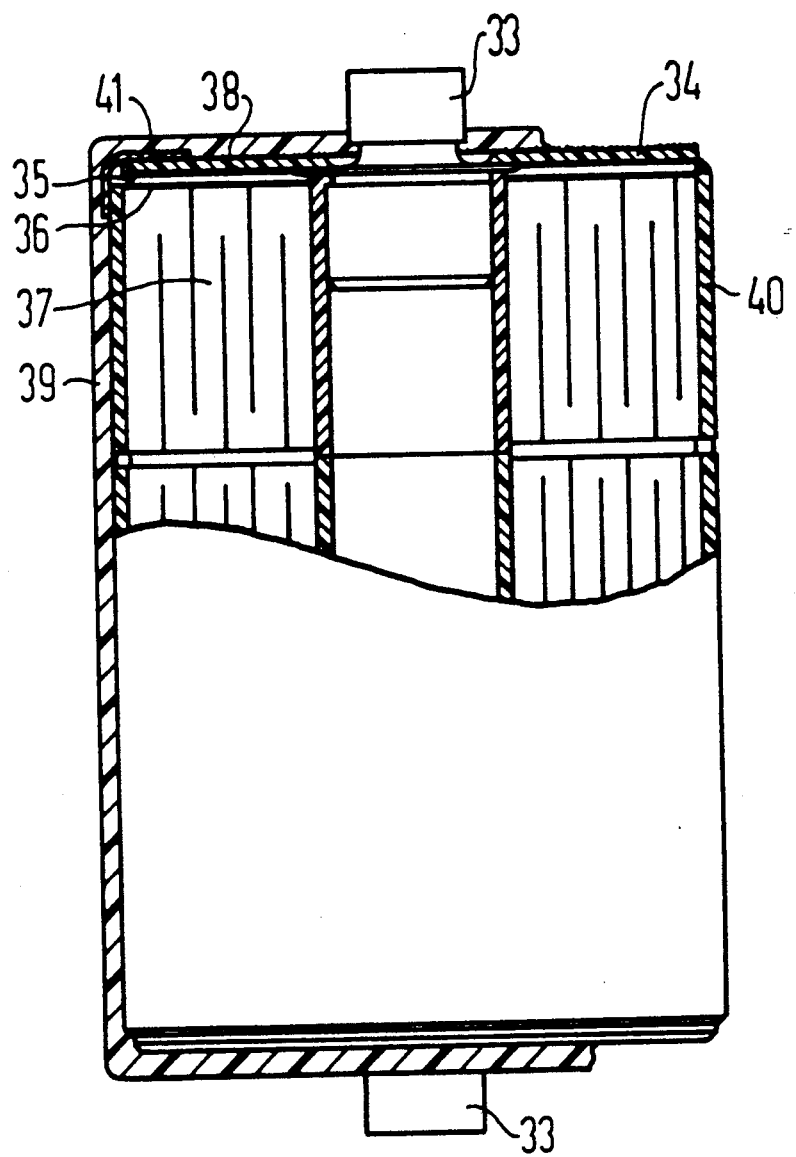

AXIALLY-WOUND ELECTRICAL CAPACITOR

BACKGROUND OF THE INVENTION

1. Field of the Invention

The present invention relates to capacitors and is particularly directed to an axially-wound electrical capacitor, particularly a power capacitor.

2. Description of the Prior Art

Capacitors of the type set forth above are constructed of dielectric plastic layers (for example, polypropylene, polycarbonate, polyethyleneterephthalate and other suitable plastics) and have regenerably thin metal layers (for example of aluminum, zinc or alloys of aluminum and zinc) as electrodes that are either applied on the dielectric layers or on carrier layers (for example, paper) arranged in the field-free space. For contacting the electrodes arranged in an offset fashion, contact layers are produced on the end faces of the windings, for example in accordance with schoopage techniques.

If required, a plurality of capacitor windings can also be interconnected with one another.

Furthermore, certain types of capacitors have an impregnation with an insulating, dielectric fluid such as, for example, mineral oil and/or an electronegative gas such as, for example, sulphur hexafluoride.

Such capacitors, particularly the liquid-impregnated capacitors, are integrated in a metal housing.

It is already well known in the art to provide smaller, non-impregnated capacitors with a plastic envelope that provides, for example, enveloping with epoxy resin or extrusion-coating with thermoplastics or, respectively, thermosetting plastics.

In addition to other components, fully-insulated capacitors in an axial structure are required for wiring GTO thyristors.

When the capacitors are manufactured with a known structure having windings tightly assembled in metal housings, there is the possibility of subsequent, full insulation. To that end, for example, the housing can be integrally cast or, respectively, extrusion-coated, and the manufacture becomes involved and expensive as a result thereof.

Given the plastic envelope heretofore known only for small types of capacitors, the envelope material must be joined with adequate tightness in the region of the lead-through of the contacts. Despite the utilization of adhesion promoters and/or despite roughening, fully satisfactory results have not been achieved either in extrusion coating or in integral casting, particularly given thermal cycling.

Given liquid-impregnated capacitor windings, furthermore, an enveloping after the impregnation is not possible due to the parting agent effect of the impregnation fluid. The plastic envelopes known in the art likewise do not provide any measures for making a flow cross-section adequate for the impregnation agent available after the fabrication of the envelope.

SUMMARY OF THE INVENTION

It is therefore an object of the invention to provide an axial electrical wound capacitor that comprises a cost-effective plastic envelope that remains tight in the region of the lead-through elements even given thermal cycling and whereby a subsequent impregnation of the capacitor is possible.

The above object is achieved, according to the present invention, in an axially-wound electrical capacitor, particularly a power capacitor composed of at least one capacitor winding arranged on a core tube, whereby the end faces of the winding are provided with schoopage layers, the two opposite end faces of the capacitor winding each having a metallic contact lead-through element that is joined to the respective schoopage layer in an electrically-conductive fashion and is centered in the core tube, and that is provided with a plastic envelope up to the lead-through region for the external connections.

According to a particular feature of the invention, the capacitor is particularly characterized in that the plastic envelope has a reinforcement of fiber roving such as fiberglass, carbon fibers or plastic fibers.

According to another feature of the invention the capacitor is particularly characterized in that at least one prestressed O-ring is respectively arranged at each of the contact lead-through elements, the O-ring being secured to the contact lead-through element with a tension ring.

According to another feature of the invention, the capacitor is particularly characterized in that the tension ring is composed of the same material as the plastic envelope.

According to another feature of the invention, the capacitor is particularly characterized in that the plastic envelope is composed of thermoplastic material and in that the tension ring is manufactured of a modification thereof having a lower melting point.

According to another feature of the invention, the capacitor is particularly characterized in that a closable drying or, respectively, impregnation opening is arranged at the contact lead-through element.

According to another feature of the invention, the capacitor comprises an internal series circuit and is particularly characterized in that an impregnation bore through the core tube is arranged through the winding structure up to an outer winding sheath and is centrally located relative to a conductor-free strip, and in that the bore diameter is smaller than the width of the conductor-free strip.

According to another feature of the invention, the capacitor is particularly characterized in that a sealing layer is arranged between the outer winding sheath and the plastic envelope.

According to another feature of the invention, the sealing layer is composed of a heat-shrinkable material.

According to another feature of the invention, the capacitor is particularly characterized in that the sealing layer is glued to the lead-through element.

According to another feature of the invention, the capacitor is particularly characterized in that a diffusion barrier is arranged in the plastic envelope.

According to another feature of the invention, the capacitor is particularly characterized in that the diffusion barrier is composed of an aluminum layer.

According to another feature of the invention, the capacitor is particularly characterized in that the drying or, respectively, impregnation opening is closed with a rivet.

According to another feature of the invention, the capacitor is particularly characterized in that a disk is arranged at the contact lead-through element.

According to another feature of the invention, the capacitor is particularly characterized in that the contact lead-through element and the disk are composed of a non-magnetic material.

According to another feature of the invention, the capacitor is particularly characterized in that the non-magnetic material comprises brass.

According to another feature of the invention, the capacitor is particularly characterized in that the disk is composed of a bottom plate of a fiberglass-reinforced plastic coated with metal on one or both sides.

According to another feature of the invention, the capacitor is particularly characterized in that the metal coating comprises copper.

According to another feature of the invention, the capacitor is particularly characterized in that the copper coating is approximately 70 μm thick.

According to another feature of the invention, the capacitor is particularly characterized in that the disk is soldered to the schoopage layer of the capacitor winding.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 5 is a partial sectioned elevation of a capacitor constructed in accordance with the present invention and having a bottom metal-coated end plate.

DESCRIPTION OF THE PREFERRED EMBODIMENT

Figure 1:
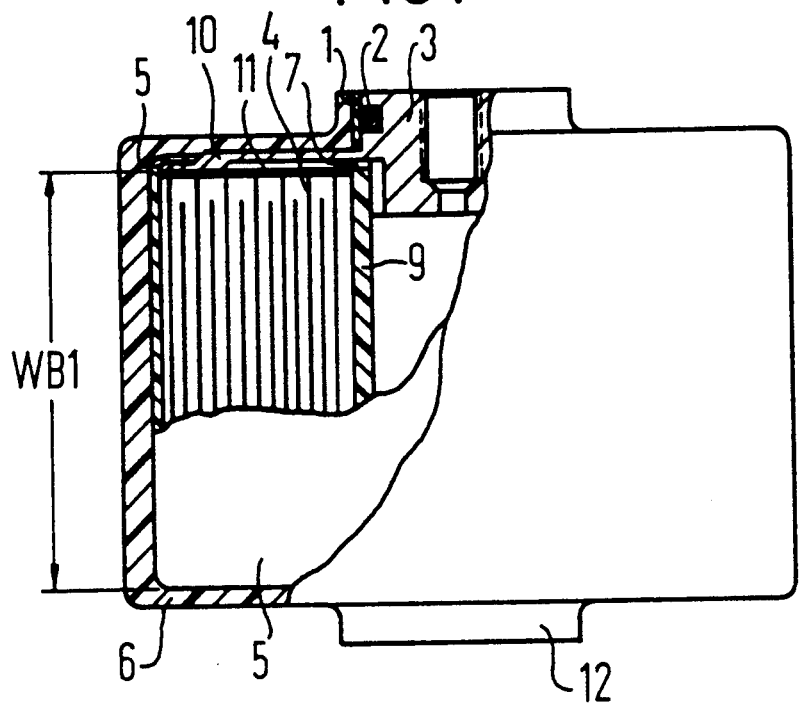
FIG. 1 is a side elevation, shown partially broken away and in section, of a capacitor constructed in accordance with the present invention.

As shown in a partially sectional view in FIG. 1, a capacitor winding 4 is arranged on a core tube 9. A capacitor winding 4 before being enveloped and before being impregnated is provided with a contact lead-through element 3 comprising a disk 10 that is centrally joined to the core tube 9. The contact lead-through element 3 has either a blind thread having an impregnation hole or a threaded pin having an impregnation hole therethrough and lying offset from the center (center not shown in FIG. 1). The impregnation holes are closed, for example, with blind rivets after the impregnation has been carried out.

The contact lead-through element 3 has at least one incision (circumferential groove) having an O-ring seal 2 therein with the dimensions of a pneumatic high-pressure seal. If required, a second O-ring seal in a second groove can also be provided.

A tension ring is pressed onto the lead-through contact element 3 before the enveloping process so that the O-ring 2 is pre-stressed and can, therefore, assume the sealing function. With its outside surface, the tension ring 1 represents the contact zone to a plastic envelope 6 and is preferably composed of the same material as the envelope 6. Given thermoplastics, the tension ring 1 can be manufactured of a modified material having a lower melting point than the basic material. An extraordinarily good adhesion between the tension ring 1 and the plastic envelope 6 is thereby obtained. The disk region 10 and the contact lead-through element 3 additionally assure the obtainable sealing quality.

The contact lead-through element 3 is executed for single windings having a defined width WB1 such that a flow channel 7 is present via the centering and/or the core tube 9 and the disk 10. For example, the disk 10 of the lead-through contact element 3 is soldered to the schoopage layer 11 of the capacitor winding 4 at three places.

A preferably shrinkable insulating layer 5 seals the envelope of the winding wall, particularly when windings are connected in series and given an interior series circuit. An appropriate design of the flow channel 7 nonetheless guarantees that the capacitor winding 4 can be adequately impregnated.

A further contact lead-through element 12 that is fashioned in the same manner as the contact lead-through element at the upper side is arranged at the lower side of the capacitor.

Figure 2:
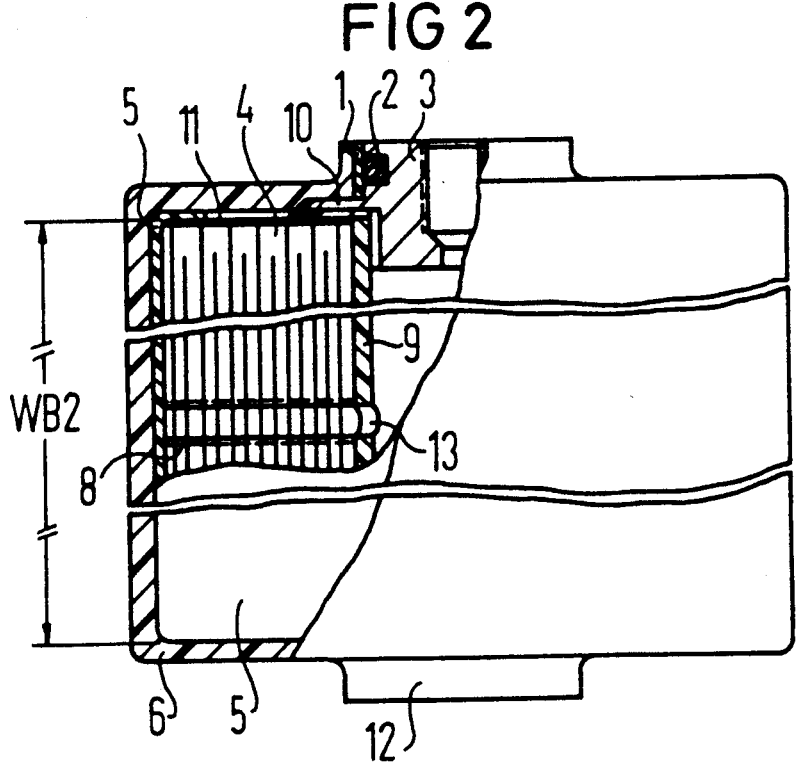
FIG. 2 is a side elevation, shown partially broken away and in section, of a capacitor constructed in accordance with the present invention and including an internal series circuit.

FIG. 2 illustrates a fully enveloped, axially-wound capacitor having an internal series circuit that a greater winding width WB2 than that of the capacitor illustrated in FIG. 1. Such windings cannot be dried and impregnated with a justifiable expense as with the embodiment illustrated in FIG. 1.

Given the capacitor of FIG. 2 having an inner series circuit, a bore 13 is therefore bored through the core tube 9 across to the outer winding sheath centrally relative to a conductor-free strip 8. The bore diameter is noticeably smaller than the width of the conductor-free strip 8.

An alternative possibility of producing a flow path for the impregnation agent via the core tube 9 is, for example, the perforation of the winding material before or during the winding process.

Although it is known to provide bores for reducing the drying time or, respectively, impregnation time given windings having an internal series circuit, a significant modification of the known art is that the bore 13 is necessarily conducted through the core tube 9. It is also required that the sealing layer 5 is thereby applied to the outer winding sheath, preferably in the form of a shrink film or, respectively, in the form of a shrink hose, in order to enable an impregnation in reasonable times after the enveloping process.

After the contact lead-through elements 3, 12 have been provided with an O-ring seal 2 and a tension ring 1 according to FIGS. 1 and 2 and after the bore 13 and the sealing layer 5 have been provided, the winding 4 prepared in this manner can be introduced into an injection mold and can be enveloped. The sealing layer 5 prevents the penetration of the injection molding compound into the bore. The tension ring 1 seals relative to the O-ring 2 and assures an ideal adhesion to the material of the envelope 6. The enveloping material can be additionally provided with a diffusion barrier (for example, aluminum foil). After the enveloping process, the capacitor treated in this manner is dried and impregnated in a known manner and the impregnation holes are closed after impregnation.

The necessity of providing a bore given an internal series circuit is eliminated under certain circumstances given non-impregnated, dry power capacitors. The proposed seal with the contact lead-through element 3 or 12, the tension ring 1 and the appertaining O-ring seal 2, however, also guarantees the required sealing in this embodiment.

Figure 3:
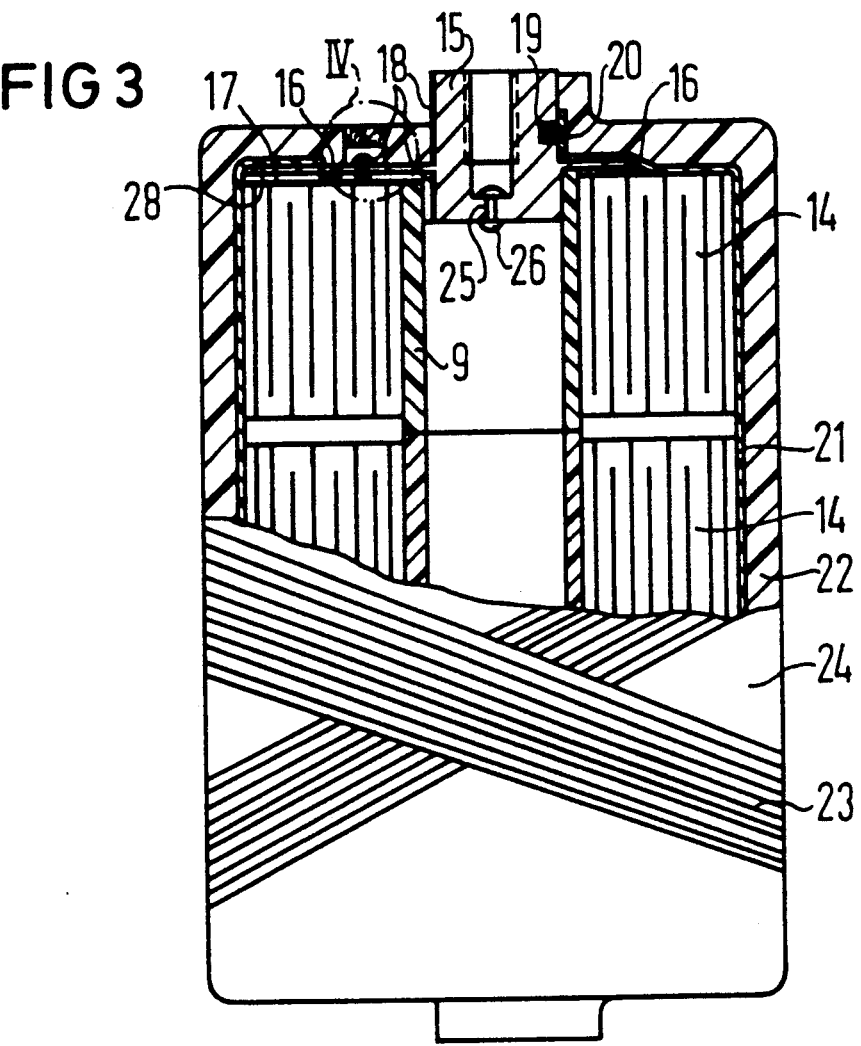
FIG. 3 is a side elevation, shown broken away and partially in section of a capacitor constructed in accordance with the present invention.

FIG. 3 illustrates an embodiment of an impregnated, axial GTO capacitor that is composed of a plurality of windings 4 interconnected with one another. The contact lead-through element 15 has a disk 28 that is composed of a non-magnetic metal, for example, of brass, and is connected to the schoopage layer 17 at the location 16 in an electrically-conductive manner. It may be adequate in a specific plastic envelope set forth below to provide a mechanically activated sealing surface 18 at the contact lead-through element 15. This embodiment is shown at the left-hand side of the contact lead-through element 15. The plastic envelope at the contact lead-through element 15 may also extend only up to the plane of the wall thickness of the end face enveloping wall of the plastic envelope 22. For embodiments in which improved tightness is a concern, an O-ring seal 19 having a tension ring 20 can also be provided as in the embodiments set forth above with respect to FIGS. 1 and 2, this being shown at the right-hand side of the contact lead-through element 15.

The envelope 22 is composed of plastic 23 reinforced with fiber roving, for example epoxy resin 24 reinforced with fiberglass roving. A polyester shrink hose 21 is arranged between the envelope 22 and the capacitor windings 1 4. A bore 25 is arranged in the contact-lead-through element 15 so that, for example, the capacitor winding 24 can be dried after the production of the plastic envelope 22. After the end of the drying process, the bore 25 is closed with a rivet 26.

The fiber-wound plastic envelope 22 shown in the exemplary embodiment of FIG. 3 has a thickness of about 3-5 mm and can be executed with a strength in the fiber direction of up to 700 N/mm² breaking limit. No leaky locations between the contact lead-through element 15 and the plastic envelope 22 occur even without the O-ring 19 and the tension ring 20 given repeated temperature changes in the specified range when the fiber roving pre-stress, the curing temperature, the activation of the contact lead-through element and the thickness of the disk 10 are properly matched to one another.

It is expedient to design the wall thickness of the disk 28 such that it can be stretched over the end face envelope 22 given temperature cyclings in view of the adhesive shearing stress that is available. The pre-stress of the fiber roving 23 is to be selected such that an adequate surface pressure is preserved given thermal cyclings.

It is advantageous to cure the envelope 22 at temperatures that lie roughly in the middle between the operating temperature limits, i.e. approximately at room temperature.

Figure 4:
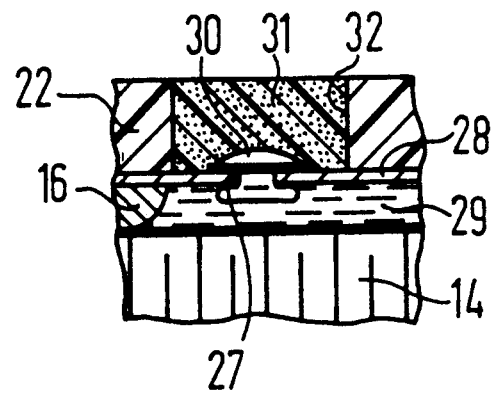
FIG. 4 is an enlarged fragmentary sectional view of a portion of FIG. 3.

FIG. 4 illustrates an alternative possibility of providing an impregnation opening 27 in the disk 28 of the lead-through element 15. An auxiliary bore 32 in the envelope 22 is required for this purpose. After the impregnation fluid 29 has been filled in, the opening 27 is closed with a rivet 30 and the auxiliary bore 32 is filled out with plastic 31, for example, epoxy resin.

FIG. 5 illustrates an embodiment of the invention wherein an end plate 34 of fiberglass-reinforced plastic is arranged at the contact lead-through element. A metal layer 35, for example, a copper layer approximately 70 μm thick, is located at the underside of the end plate 34. The metal layer 35 is tightly soldered to the schoopage layer 36 of the stacked (wound) capacitor 37, so that an oil-tight termination of the capacitor winding 37 arises in the axial direction. The upper side 38 of the end plate 34 is activated by turning or sanding to provide better adhesion for the plastic envelope 39. Instead of the soldering, the winding stack of the capacitor 37 can also be provided with an enveloping layer or, respectively, with an enveloping resin layer that overlaps the insulating layer 40 by, for example, about 5 mm. A stacked capacitor winding 37 that is integrated in an oil-tight manner likewise arises on the basis of these measures.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An axially-wound electrical capacitor, comprising:
a hollow core tube;
a capacitor winding structure carried on said hollow core tube, said capacitor winding structure including a pair of end faces;
a pair of conductive layers each carried on a respective end face and electrically contacting the winding structure;
a pair of centrally-disposed electrical lead-through contacts each located at a respective end of said capacitor centered in said hollow core tube and electrically connected to the respective conductive layer, each of said lead-through contacts comprising a generally cylindrical central portion, a disk extending from said central portion and in electrical contact with the respective conductive layer, a circumferential groove in and extending about said central portion, an O-ring in said groove, and a tension ring about said central portion pre-stressing said O-ring in said groove; and
a plastic envelope covering said capacitor up to said lead-through contacts and sealing said tension rings.

2. The axially-wound electrical capacitor of claim 1, wherein:
each of said tension rings comprises the same material as said plastic envelope.

3. The axially-wound electrical capacitor of claim 2, wherein:
said plastic envelope comprises a thermo-plastic material; and
each of said tension rings comprises a modification of said thermo-plastic material of said plastic envelope and having a melting point that is lower than the melting point of said thermo-plastic material of said plastic envelope.

4. An axially-wound electrical capacitor, comprising:
a hollow core tube;
a capacitor winding structure carried on said hollow core tube, said capacitor winding structure including a pair of end faces;
a pair of conductive layers each carried on a respective end face and electrically contacting the winding structure;
a pair of centrally-disposed electrical lead-through contacts each located at a respective end of said capacitor centered in said hollow core tube and electrically connected to the respective conductive layer;

a pair of closable drying or impregnation passageways each extending through a respective one of said lead-through contacts; and a plastic envelope covering said capacitor up to said lead-through contacts.

5. The axially-wound electrical capacitor of claim 4, wherein:

said capacitor winding structure comprises a wound dielectric layer including a plurality of spaced conductive layers with a conductive-free strip therebetween on said dielectric layer to define separate capacitor windings, alternate ones of said conductive layers extending to the respective winding end face and electrically connected to the respective conductive layer;

a bore extending through said winding structure within the limits of said conductive-free strip and into said hollow core tube;

said bore constituting an impregnation bore and having a diameter that is smaller than the width of said conductive-free strip; and an outerwinding sheath about said capacitor winding structure and beneath said plastic envelope for preventing penetration of the molding compound of said plastic envelope into said bore.

6. The axially-wound electrical capacitor of claim 5, wherein:

said sheath comprises a heat-shrinkage material.

7. The axially-wound electrical capacitor of claim 5, wherein:

glue attaches said sheath to said lead-through contacts.

8. The axially-wound electrical capacitor of claim 4, and further comprising:

a pair of rivets each closing a passageway through a respective lead-through contact.

9. An axially-wound electrical capacitor, comprising:

a hollow core tube;

a capacitor winding structure carried on said hollow core tube, said capacitor winding structure including a pair of end faces;

a pair of conductive layers each carried on a respective end face and electrically contact the winding structure;

a pair of centrally-disposed electrical lead-through contacts each located at a respective end of said capacitor centered in said hollow core tube and electrically connected to the respective conductive layer; and a plastic envelope covering said capacitor up to said lead-through contacts and comprising a diffusion barrier therein.

10. The axially-wound electrical capacitor of claim 9, wherein:

said diffusion barrier comprises an aluminum layer.

11. An axially-wound electrical capacitor, comprising:

a hollow core tube;

a capacitor winding structure carried on said hollow core tube, said capacitor winding structure including a pair of end faces;

a pair of conductive layers each carried on a respective end face and electrically contacting the winding structure;

a pair of centrally-disposed electrical lead-through contacts each located at the respective end of said capacitor centered in said hollow core tube and electrically connected to the respective conductive layer;

a pair of disks, each of said disks comprising a fiberglass-reinforced member including a metal coating on at least one side, said metal coating contacting the respective end face conductive layer and the respective lead-through contact; and a plastic envelope covering said capacitor up to said lead-through contacts.

12. The axially-wound electrical capacitor of claim 11, wherein:

said metal coating comprises copper.

13. The axially-wound electrical capacitor of claim 12, wherein:

said copper coating has a thickness of approximately 70 $\mu$m.

14. The axially-wound electrical capacitor of claim 11, wherein:

said metal coating is soldered to the respective end face conductive coating.

* * * * *